L. SCHOTTGEN.
DELIVERY WAGON FOR FERMENTED LIQUIDS.
APPLICATION FILED JUNE 13, 1912.

1,047,452.

Patented Dec. 17, 1912.

2 SHEETS—SHEET 1.

Witnesses:
John Murtagh
M. A. Dulon

Inventor
Louis Schottgen
By his Attorneys
Goepel & Goepel

L. SCHOTTGEN.
DELIVERY WAGON FOR FERMENTED LIQUIDS.
APPLICATION FILED JUNE 13, 1912.
1,047,452.
Patented Dec. 17, 1912.
2 SHEETS—SHEET 2.
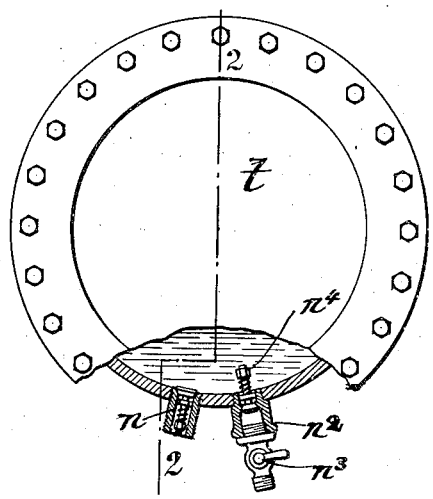
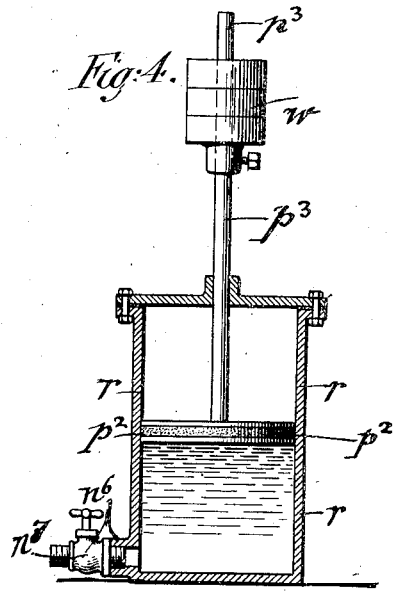
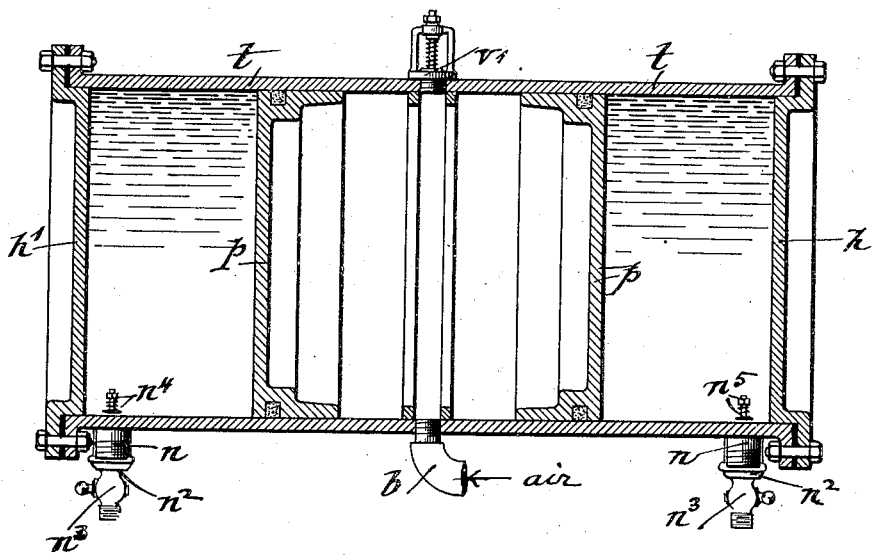
Witnesses:
John Murtagh
M. D. Dillon
Inventor
Louis Schottgen
By his Attorneys

UNITED STATES PATENT OFFICE.

LOUIS SCHOTTGEN, OF NEW YORK, N. Y.

DELIVERY-WAGON FOR FERMENTED LIQUIDS.

1,047,452.  Specification of Letters Patent.  Patented Dec. 17, 1912.

Application filed June 13, 1912. Serial No. 703,339.

*To all whom it may concern:*

Be it known that I, LOUIS SCHOTTGEN, a citizen of the United States of America, residing in New York, borough of Brooklyn, county of Kings, and State of New York, have invented certain new and useful Improvements in Delivery-Wagons for Fermented Liquids, of which the following is a specification.

This invention relates to an improved delivery-wagon for transporting and conveying fermented liquids from the place of manufacture to the storage-tanks of the customer.

Heretofore fermented liquids, such as larger-beer and the like, were racked off in the brewery into shipping-packages and then shipped to the customer. This requires the racking-off of the beer or other liquid into the shipping-packages, the transportation of the same to the customer, the return of the packages to the brewery or other place of manufacture, and the washing and pitching of the packages for receiving a new charge of liquid.

This invention is designed to substitute for the present mode of racking-off and shipping fermented liquids, a new system of shipment and delivery, which comprises a tank-wagon into which the beer or other fermented liquid is racked off and retained under pressure during transportation, and then drawn off at the place of business of the customer into dispensing-tanks of smaller size from which the liquid is drawn at the bar or counter under pressure.

The invention consists more specifically of a delivery-wagon which comprises a cylindrical or other tank placed on wheels, a piston in said tank, means for charging the tank and means for delivering the liquid from the tank, and means for supplying compressed air into the space at the interior of the tank between the piston and the adjacent head of the tank, as will be fully described hereinafter and finally pointed out in the claims.

The invention consists further of certain details of construction and combination of parts which will be fully described hereinafter and finally pointed out in the claims.

Figure 1:
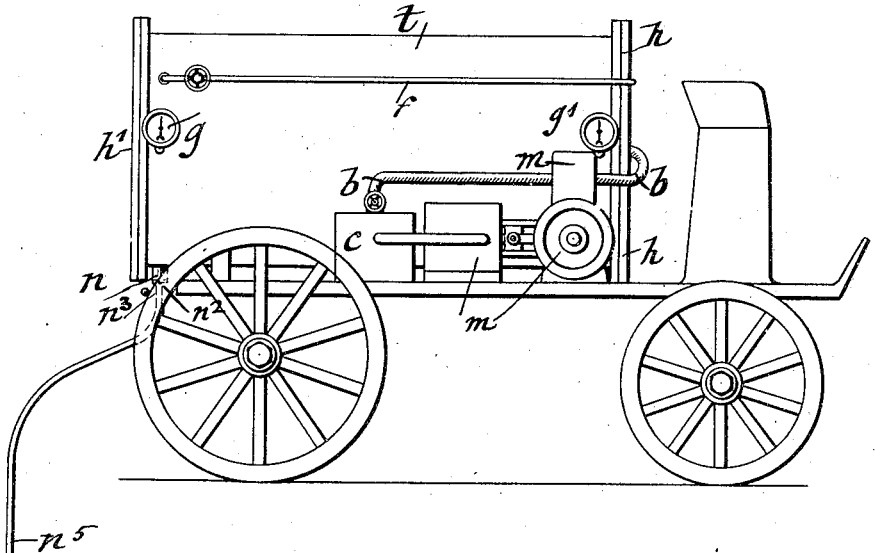
Figure 2:
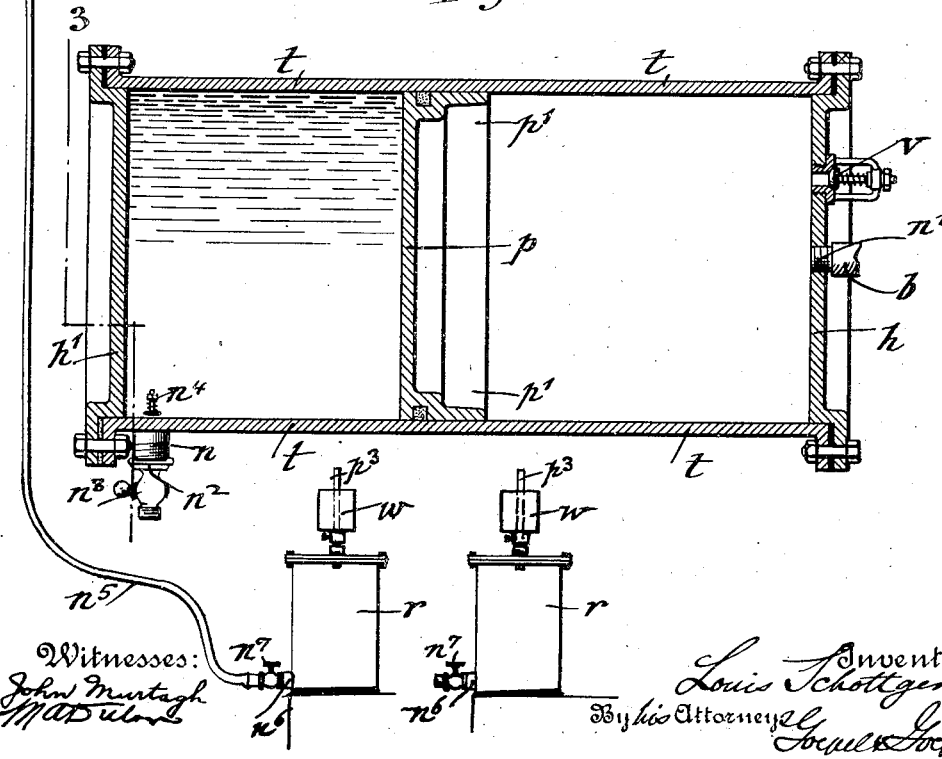

In the accompanying drawings, Figure 1 represents a side-elevation of my improved delivery-wagon for fermented liquids, shown as connected with the individual dispensing-tanks in the cellar or basement of the customers for drawing off the liquid into said dispensing-tanks, Fig. 2 is a vertical longitudinal section of the tank of my improved delivery-wagon taken on line 2, 2, Fig. 3, Fig. 3 is a rear-elevation of the tank, partly in section on line 3, 3, Fig. 2, Fig. 4 is a vertical central section of the receiving-tank at the house of the customer, and Fig. 5 is a longitudinal sectional view, showing a modified construction of the delivery-tank and provided with two pistons so as to ship two different kinds of beer or fermented liquids at the same time.

Similar letters of reference indicate corresponding parts throughout the different figures of the drawings.

Referring to the drawings, $t$ represents the tank of my improved delivery-wagon, which tank is preferably made of cylindrical shape and of a sufficient size to contain from twenty to thirty barrels of lager-beer or other fermented liquid. It is preferably made of porcelain-lined boiler-iron and supported on a wheeled frame, which is drawn either by horses or propelled by power. The tank is provided with heads $h$, $h^1$ respectively at the front and rear end, which are connected by means of flanges and bolts and interposed packing with the ends of the tank, as shown clearly in Fig. 2. The heads are provided with hand-holes and covers for getting at the interior of the tank for cleaning the same. At the interior of the tank is arranged a sliding piston $p$, which keeps the liquid under pressure without loss of gas. At the lower part of the rear-end of the tank $t$ is arranged a nipple $n$ which is connected by a hose with the storage-cask to be racked off, so that the liquid can be charged under pressure into the tank until the piston $p$ arrives at the front-end of the tank and abuts by its flange-portion $p^1$ against the front-head $h$ of the tank. To the head $h$ of the tank is applied a nipple $n^1$ which is connected by a hose $b$ with an air supply-pump $c$, which is driven by a gasolene, electric or other motor $m$ that is supported sidewise of the tank on the frame of the wagon. The tank is provided with two pressure-gages $g$, $g^1$, one for that part of the tank which is charged with the fermented liquid and the other for that part of the tank which is charged with compressed air. The compressed air acting on the piston holds the fermented liquid always under pressure so as to prevent the escape of any carbonic-acid gas from the same while in transit. A safety-valve $v$ is arranged in the front-head $h$ of the piston so as to permit the escape of the compressed air when the air-space is charged with too high a degree of pressure.

Adjacent to the valved charging-nipple $n$ the tank is provided with a discharge-pipe $n^2$ having a stopcock $n^3$. The discharge-pipe $n^2$ is provided at its inner end with a check-valve $n^4$. When the delivery-wagon arrives at the place of delivery, the discharge-pipe $n^2$ is connected by a hose $n^5$ with the dispensing-tank $r$ in the refrigerator of the customer, said dispensing-tank $r$ being provided with a nipple $n^6$ having a stopcock $n^7$ and a weighted piston $p^2$. The piston-rod $p^3$ of the piston $p^2$ passes through the head of the tank and is provided at its upper end with an adjustable weight $w$ so as to keep a certain amount of pressure on the liquid drawn off from the shipping-tank into the dispensing-tank. The dispensing-tank is made large enough for receiving from one to ten barrels, according to the quantity of liquid dispensed, per day; but a number of dispensing-tanks may be arranged in the refrigerator of the customer, if required by him.

When the contents of the delivery-tank are discharged, after supplying a number of customers, and the piston arrives gradually near the rear-head of the tank, it is arrested in its motion by the inwardly-extending check-valve $n^4$ of the discharge-pipe $n^2$. A valved air supply-pipe $f$, which extends horizontally along the outside of the tank from an opening in the front-head to an opening near the rear-head $h^1$, is then opened, so that compressed air from the air-space in the tank is transferred to the liquid in the space between the piston and the rear-head of the tank, so that all the liquid in the tank can be discharged. This supply-pipe for the compressed air is necessary as the piston cannot move beyond the check-valve $n^4$ and could not force all the liquid out of the tank into the dispensing-tanks.

The dispensing-tank is connected with the bar or counter of the saloon or other place where the liquid is to be dispensed, which is done by means of a connecting-hose and by means of the pressure applied by the weighted piston $p^2$ to the liquid in the tank, the hose connecting the dispensing-tank with the faucet of the bar or counter. The dispensing-tank takes the place of the shipping-kegs and forms a permanent fixture in the place of the customer.

When the delivery-tank is returned to the brewery or other place of manufacture, the interior of the tank is cleaned by washing the same with water supplied through the hand-holes in the heads, the piston being returned to its initial position near the front-head of the tank by introducing compressed air from the pump into the space formerly taken up by the liquid. For repairing the delivery-tank, the heads at both ends of the tank may be removed and a thorough cleaning and relining given to the interior of the tank.

In Fig. 5 is shown a modification of the delivery-tank so as to permit the shipping of liquids of different color or kind, such as light and dark beer and the like. In this case two pistons are arranged at the interior of the tank, with a space for the compressed air between the same. The supply-pipe for the compressed air is connected with the middle portion of the tank. A safety-valve $v^1$ is arranged for the air-space and two supply-nipples $n$ and discharge-pipes $n^2$ at each end of the tank. In other respects the working of the double tank is the same as the working of the single delivery-tank.

The quantity of liquid in the dispensing-tank can be readily ascertained. The delivery-tank is provided at the inlet with a meter by which the quantity of liquid racked off can be ascertained, and which is sealed by a revenue officer when the tank is filled, the seal being broken by the officer when the tank is to be filled again. The discharge-pipe may also be provided with a meter for measuring the quantity of liquid supplied to the various customers. By comparing the indicators on both meters the quantity of liquid still in the tank can be ascertained at any time.

The entire delivery-tank may be surrounded in hot weather by means of ice, so as to keep the contents of the tank at a low temperature in hot weather while the liquid is in course of transportation.

The advantages of my improved shipping or delivery tank for fermented liquids are, first, that the large number of shipping-packages, that is to say, half-barrels, quarters, sixths, etc., are dispensed with; second, that the cleaning and pitching of the same on their return to the brewery is dispensed with; third, that a considerable saving of expense for labor in racking-off, shipping and washing the kegs is obtained, for the reason that these different operations are accomplished under pressure in a quick and convenient manner and without the admission of any outside air; and, lastly, that the drawing-off of the liquid from the dispensing-tanks is greatly simplified and facilitated.

I claim:

1. The combination of a tank, a piston in said tank dividing it into a space for liquid and a space for air, a valved supply-nipple for the liquid-space in the tank, a valved discharge-pipe for the liquid, an air supply-pipe for charging compressed air into the air-space of the tank, and a valved air-pipe connecting the air-space with the liquid-space of the tank.

2. The combination of a tank, a piston in said tank, a supply-pipe for the liquid, a discharge-pipe for the liquid, means for supplying compressed air into the air-space of the tank at one side of the piston, and a valved air-pipe connecting the air-space with a point near the end of the liquid-space of the tank.

3. The combination of a tank, a piston in said tank dividing it into a space for liquid and a space for air, a valved supply-pipe for the liquid-space, a valved discharge-pipe for the same, an air supply-pipe for charging the air-space with compressed air, a valved air-pipe connecting the air-space with the liquid-space, a dispensing-tank at the place of dispensing the liquid, and a hose-connection between the discharge-pipe of the delivery-tank and the dispensing-tank.

In testimony, that I claim the foregoing as my invention, I have signed my name in presence of two subscribing witnesses.

LOUIS SCHOTTGEN.

Witnesses:
  PAUL GOEPEL,
  JOHN MURTAGH.